(12) United States Patent
Harper et al.

(10) Patent No.: US 7,874,399 B2
(45) Date of Patent: Jan. 25, 2011

(54) WET BRAKE SYSTEM, REAR GEAR ASSEMBLY INCLUDING WET BRAKE SYSTEM AND VEHICLE INCLUDING SAME

(75) Inventors: Bryan M. Harper, Sharpsburg, GA (US); Andrew Metzger, Newnan, GA (US); Bruce Younggren, Bemidji, MN (US); Brian Wolf, Bemidji, MN (US)

(73) Assignees: Yamaha Motor Manufacturing Corporation of America, Newnan, GA (US); Team Industries, Inc., Bagley, MN (US)

( * ) Notice: Subject to any disclaimer, the term of this patent is extended or adjusted under 35 U.S.C. 154(b) by 476 days.

(21) Appl. No.: 11/426,293

(22) Filed: Jun. 23, 2006

(65) Prior Publication Data

US 2008/0017434 A1 Jan. 24, 2008

(51) Int. Cl.
*B60D 17/00* (2006.01)
(52) U.S. Cl. .................. 180/370; 188/71.5; 188/71.6; 188/264 D; 188/264 E; 192/215
(58) Field of Classification Search .............. 280/370; 188/71.5, 71.6, 264 D, 264 E; 192/215; 180/370
See application file for complete search history.

(56) References Cited

U.S. PATENT DOCUMENTS

| | | | |
|---|---|---|---|
| 1,380,584 A | 6/1921 | Parker | |
| 2,913,928 A * | 11/1959 | Double | 475/86 |
| 3,517,572 A | 6/1970 | Schmid | |
| 3,621,957 A | 11/1971 | Howe | |
| 3,690,426 A | 9/1972 | Weisgerber | |
| 3,994,375 A | 11/1976 | Stritzel | |
| 4,016,957 A | 4/1977 | Osujo et al. | |
| 4,352,415 A * | 10/1982 | Powell | 188/156 |
| 4,468,981 A | 9/1984 | Ries | |
| 4,534,440 A | 8/1985 | Sekizaki et al. | |
| 4,593,782 A | 6/1986 | Nobusawa et al. | |
| 4,667,760 A | 5/1987 | Takimoto | |
| 4,719,984 A | 1/1988 | Watanabe | |
| 4,736,821 A | 4/1988 | Ries | |
| 4,856,373 A | 8/1989 | Washizawa | |
| 4,893,525 A | 1/1990 | Gabor | |
| 5,337,853 A | 8/1994 | Magni | |
| 5,673,776 A | 10/1997 | Fitch et al. | |
| 6,182,800 B1 | 2/2001 | Mochizuki et al. | |
| 6,293,890 B1 | 9/2001 | Kaku | |
| 6,345,712 B1 | 2/2002 | Dewald et al. | |

(Continued)

FOREIGN PATENT DOCUMENTS

DE 4215453 A1 10/1993

(Continued)

*Primary Examiner*—Paul N. Dickson
*Assistant Examiner*—Barry Gooden, Jr.
(74) *Attorney, Agent, or Firm*—Keating & Bennett, LLP

(57) ABSTRACT

A vehicle includes a combined wet brake and rear gear assembly supported by a pair of frames. The combined wet brake and rear gear assembly includes a housing having at least one gear and a wet brake provided therein. An input shaft is connected to the gear and to the engine of the vehicle. The wet brake is located between one of the pairs of frames and the input shaft in the transverse direction of the vehicle in a top plan view.

19 Claims, 9 Drawing Sheets

U.S. PATENT DOCUMENTS

| | | |
|---|---|---|
| 6,354,421 B1 | 3/2002 | Mochizuki et al. |
| 6,401,857 B1 | 6/2002 | Hisada et al. |
| 6,536,560 B1 | 3/2003 | DeWald |
| 6,729,992 B2 | 5/2004 | Ima |
| 6,805,217 B2 | 10/2004 | Kinouchi et al. |
| 6,837,330 B2 | 1/2005 | Suzuki |
| 6,848,531 B2 | 2/2005 | Izumi et al. |
| 7,114,598 B2 * | 10/2006 | Takagi ................ 188/71.6 |
| 2003/0158012 A1 | 8/2003 | Kwoka |
| 2004/0040776 A1 | 3/2004 | Takagi |

FOREIGN PATENT DOCUMENTS

| | | |
|---|---|---|
| EP | 0076387 A1 | 4/1983 |
| GB | 2237081 A | 4/1991 |
| JP | 63-312236 A | 12/1988 |
| JP | 03-213452 A | 9/1991 |
| JP | 11-029013 A | 2/1999 |
| JP | 2000-052943 A | 2/2000 |
| WO | 88/08383 A1 | 11/1988 |

\* cited by examiner

WET BRAKE SYSTEM, REAR GEAR ASSEMBLY INCLUDING WET BRAKE SYSTEM AND VEHICLE INCLUDING SAME

BACKGROUND OF THE INVENTION

1. Field of the Invention

The present invention relates to a brake system for a vehicle, such as a four-wheel drive vehicle, an all-terrain vehicle (ATV), a side-by-side vehicle, and other types of vehicles, and more specifically, the present invention relates to a wet friction disk brake system incorporated in a rear reduction gear assembly in such a vehicle.

2. Description of the Related Art

FIGS. 1A and 1B illustrate a known ATV 101. The ATV 101 includes a body frame 102 formed mostly of pipe members assembled by welding. An engine 125 is mounted on a middle portion of the body frame 102. Front wheels 120 provided with low-pressure tires, i.e., balloon tires, are suspended from front right and front left portions of the body frame 102. Rear wheels 121 provided with low-pressure tires are suspended from rear right and rear left portions of the body frame 102. The rear wheels 121 are supported on rear end portions of a swing arm 129 pivotally joined to a rear lower end portion of the body frame 102 for swinging motion in a vertical plane and supported by a suspension system 132. The front wheels 120 are supported by right and left linkages 130 individually connected to a front lower end portion of the body frame 102 and supported by shock absorbers 133 so as to be able to swing in a vertical plane. The handlebar 122 is operated to control the front wheels 120 for steering.

As shown in FIG. 1A, the front wheels 120 and the rear wheels 121 are driven by a transmission including drive shafts, not shown, and differential gears 134 and 135 connected to the engine 125 and mounted on the body frame 102. A front carrier rack 131 is mounted on the front fender 107 and permits loading and supporting of baggage thereon from the front side of the ATV 101. Front fender 107 also encloses a pair of headlights 106, as shown in FIG. 1B. The front carrier rack 131, the handlebar 122, the fuel tank 124, and the seat 123 are arranged on the body frame 102 in that order from the front toward the rear of the body frame 102. A rear carrier rack 126 is located behind the seat 123 and is mounted on the rear fender 108.

The front wheels 120 are covered with the front fender 107. The rear wheels 121 are covered with the rear fender 108. A cover 109 is provided on the body frame 102 between the front fender 107 and the rear fender 108 so as to surround the fuel tank 124. Exhaust pipes 136 extend rearward from the exhaust ports of the cylinders of the engine 125 and are connected to the muffler 127.

A conventional assembly of a rear differential driving and braking system used in these types of vehicles is shown in FIG. 5 of U.S. Pat. No. 6,293,890, and includes a rear reduction gear assembly having a wet type multiplate braking system provided therein. FIGS. 1 and 2 of U.S. Pat. No. 6,293,890 show another vehicle including a wet type multiplate braking system provided in a rear gear case. In addition, the arrangements of the wet brake systems in the rear gear assemblies according to both types of structures described in U.S. Pat. No. 6,293,890 are very complicated, and do not allow for the combined wet brake and rear gear assembly to be located at various positions within the vehicle. This is partially due to the fact that the drive mechanisms used in these conventional vehicles are differential drive mechanisms and due to the fact that the wet type multiplate braking system is located on the input shaft of the rear gear, both of which facts cause significant limitations in the design freedom of locating and installing the combined wet brake and rear gear assembly at various positions in the vehicle. Also, these differential gear and braking systems are inefficient and may result in brake failure. As a result, the wet type multiplate braking system must be positioned at a very specific location within the vehicle which significantly limits the flexibility and design freedom of locating the combined wet brake system and rear gear case relative to the engine output and wheels of the vehicle.

U.S. Pat. No. 4,856,373 also teaches a conventional vehicle having a rear differential gear assembly including multiple brake disks. The rear differential gear assembly of U.S. Pat. No. 4,856,373 includes complicated differential gearing and a plurality of brake disks that must be mutually compressed to achieve braking. As a result, the combined wet brake and rear gear assembly in this conventional device can only be located at the rear wheel as seen in FIG. 2 of U.S. Pat. No. 4,856,373. Also, this conventional device suffers from the same disadvantages such as inefficient braking and complicated assembly as described above with respect to U.S. Pat. No. 6,293,890.

U.S. Patent Application Publication No. 2004/0040776 and U.S. Pat. No. 6,805,217 disclose in FIGS. 3 and 4, a casing for housing a final reduction gear for rear wheels and a wet multiple-disk braking device which is mounted in front of the final reduction gear in a direction of forward movement of a four-wheel vehicle. By mounting the wet multiple-disk brake in front of the final reduction gear, the wet multiple-disk braking device directly stops or brakes the rotation of the input shaft of the final reduction gear. The arrangement of the wet brake mounted in front of the final reduction gear, and the operation of directly stopping the rotation of the input shaft of the final reduction gear is complicated, limits design freedom and provides for inefficient braking of the rear wheels. In addition, if the gear fails in this structure, brake failure may occur resulting in the inability to slow or stop the rear wheels. Furthermore, the location of the rear gear case and location of the wet multiple-disk braking device which is mounted in front of the final reduction gear prevents minimization of the distance to the engine output.

SUMMARY OF THE INVENTION

To overcome the problems described above, preferred embodiments of the present invention provide a wet brake system provided in a rear gear assembly of a vehicle that has a very compact structure, provides for more efficient braking of the vehicle with a relatively simple design, increases the flexibility and design freedom for locating the combined wet brake system and rear gear assembly at various positions within the vehicle, and optimizes the drive train performance by optimizing the offset angles of the rear drive shafts.

According to a preferred embodiment of the present invention, a vehicle preferably includes a brake device, a gear, a housing surrounding the brake device and the gear, first and second frames supporting the housing, an input shaft connected to the gear. The brake device is preferably located between one of the first and second frames and the input shaft in the transverse direction of the vehicle in a top plan view.

The housing preferably surrounds the brake device and the gear and a fluid is contained and sealed within the housing. The brake device can be a wet friction disk brake device. The brake device preferably includes a plurality of friction plates. A main surface of each of the plurality of friction plates is preferably substantially parallel to a centerline of the input shaft. The axis of rotation of the plurality of friction plates is preferably substantially parallel to an axis of rotation of the gear. The plurality of friction plates has a diameter that is preferably larger than a diameter of the gear. The gear is preferably a ring gear, including a bevel gear.

The housing can also include a lever for operating the brake device. At least one cable is preferably connected to the lever. A portion of the at least one cable is preferably located between one of the first and second frames and the input shaft in the transverse direction of the vehicle in the top plan view.

The vehicle preferably includes an output shaft connected to the gear and a lever shaft connected to the lever. The centerline of the lever shaft is preferably substantially parallel the centerline of the output shaft in a top plan view, and the lever shaft is preferably located further toward the front of the vehicle than the output shaft.

The vehicle preferably includes a universal joint connected to the input shaft, where the lever shaft is preferably located between the output shaft and the universal joint.

The input shaft is preferably offset from the engine output shaft in the transverse direction of the vehicle in the top plan view. The input shaft is preferably substantially parallel to the engine output shaft in the top plan view. The brake device is preferably located between the engine output shaft and the input shaft in the transverse direction of the vehicle in the top plan view. Preferably, the input shaft is located on one side of the longitudinal centerline of the vehicle in the top plan view, and the brake device is located on the other side of the longitudinal centerline of the vehicle in the top plan view.

The vehicle preferably includes a propeller shaft connected to the input shaft and the engine output shaft. The centerline of the propeller shaft is preferably inclined with respect to the longitudinal centerline of the vehicle in the top plan view, and the front end of the propeller shaft is preferably spaced away from the longitudinal centerline of the vehicle in the top plan view.

The brake device is preferably located between the engine output shaft and the input shaft in the transverse direction of the vehicle in the top plan view. The gear is preferably located between one of the first and second frames and the input shaft in the transverse direction of the vehicle in the top plan view. The gear is preferably located between the input shaft and the brake device in the transverse direction of the vehicle in a top plan view.

The vehicle preferably includes an independent suspension connected to the brake device and the gear.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1A:
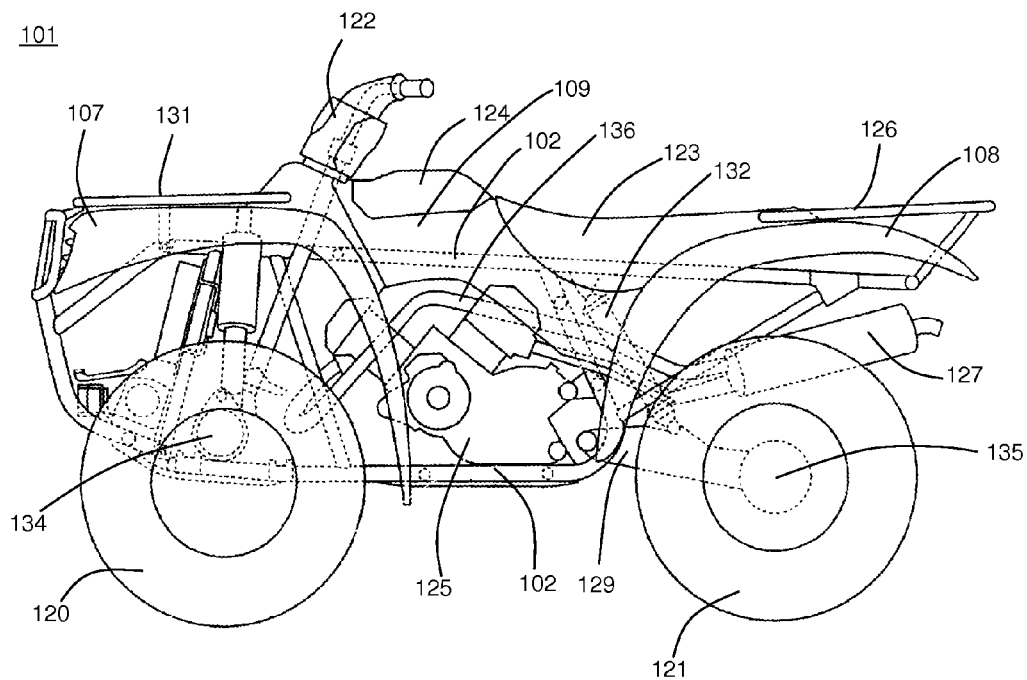
FIG. 1A is a side view and FIG. 1B is a front view of a known ATV to which preferred embodiments of the present invention may be applied.
Figure 1B:
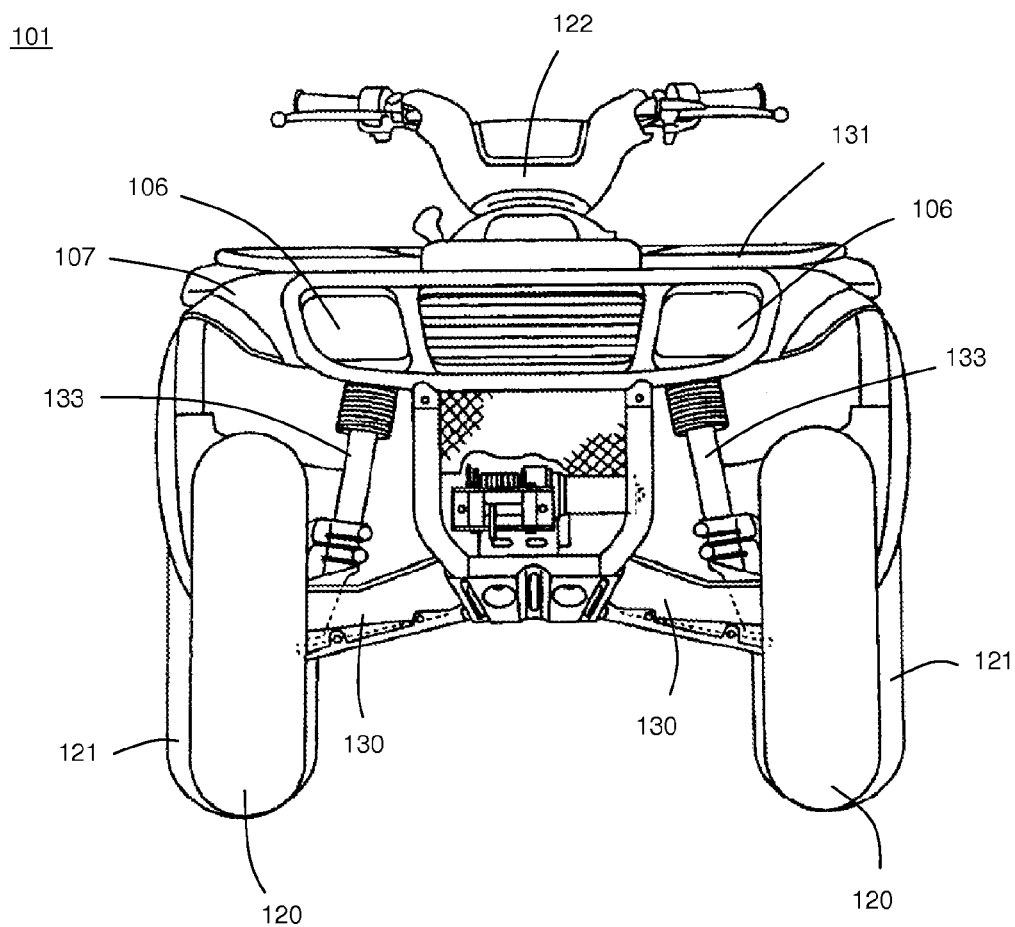
Figure 2:
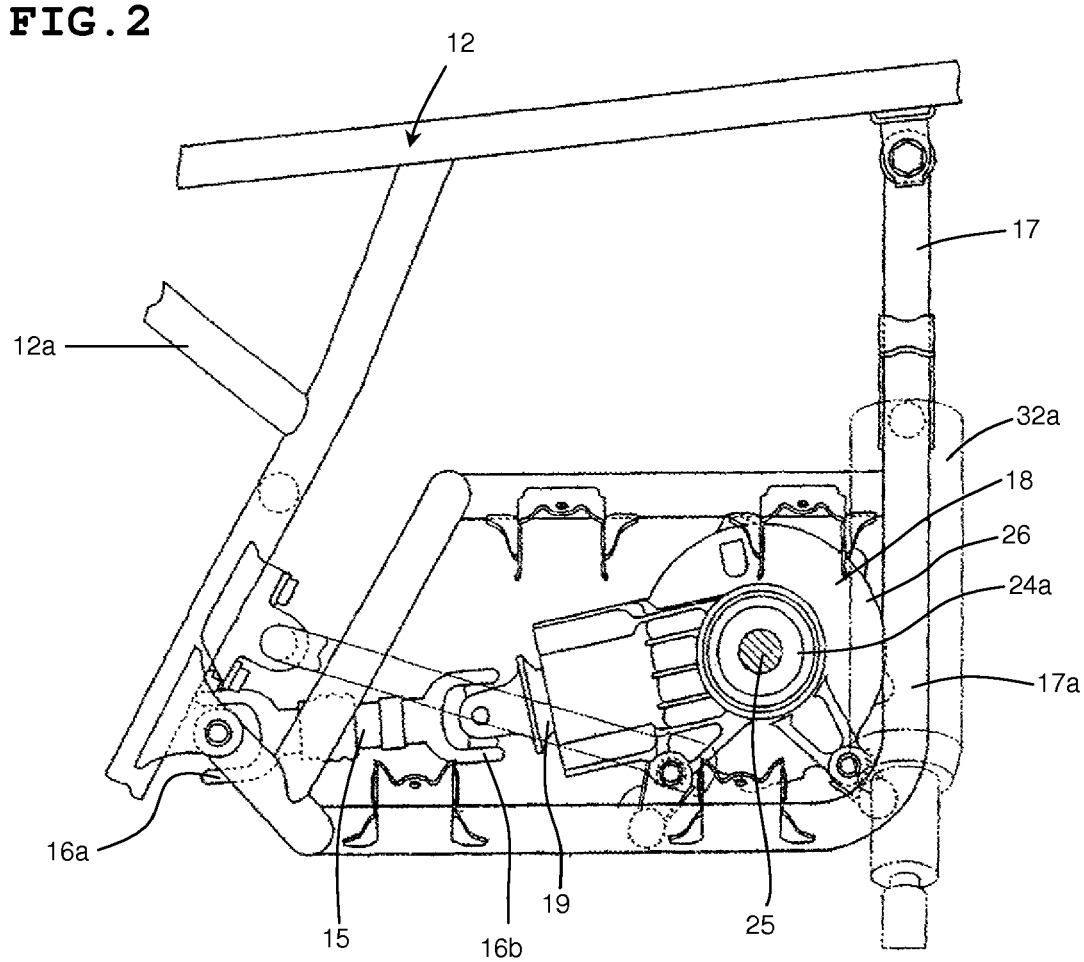
FIG. 2 is partial side view of a frame assembly of a vehicle according to a preferred embodiment of the present invention.
Figure 3:
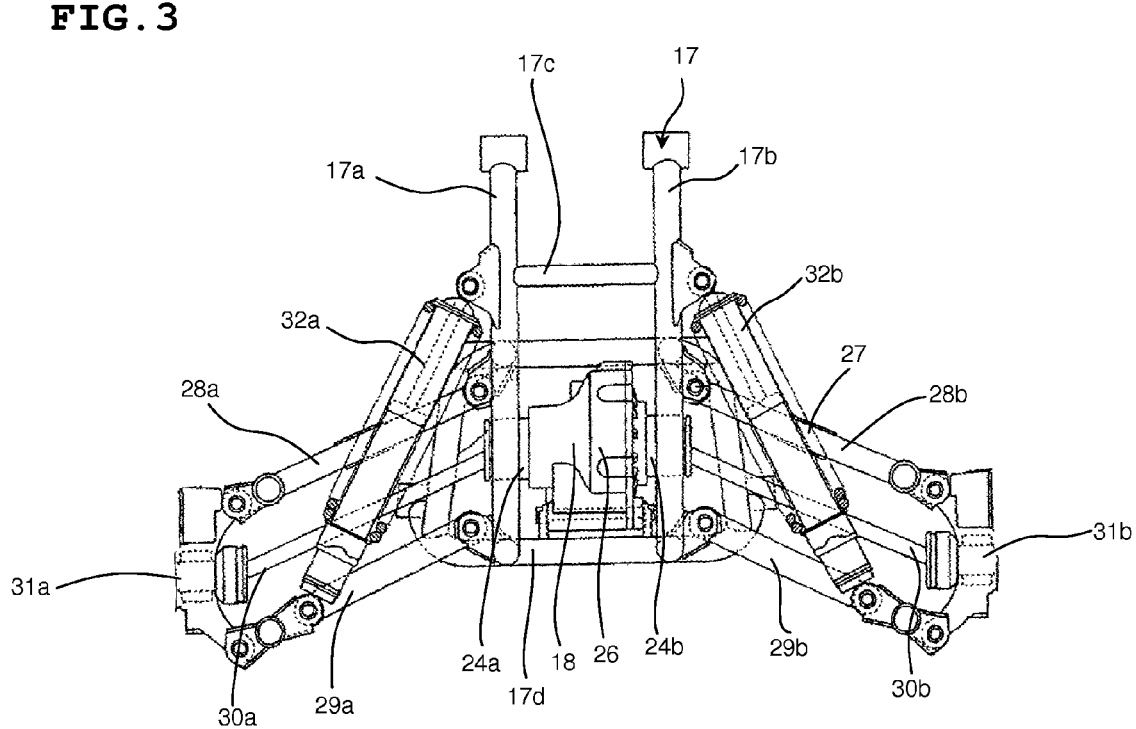
FIG. 3 is a partial rear view of a suspension assembly of a vehicle according to a preferred embodiment of the present invention.
Figure 4A:
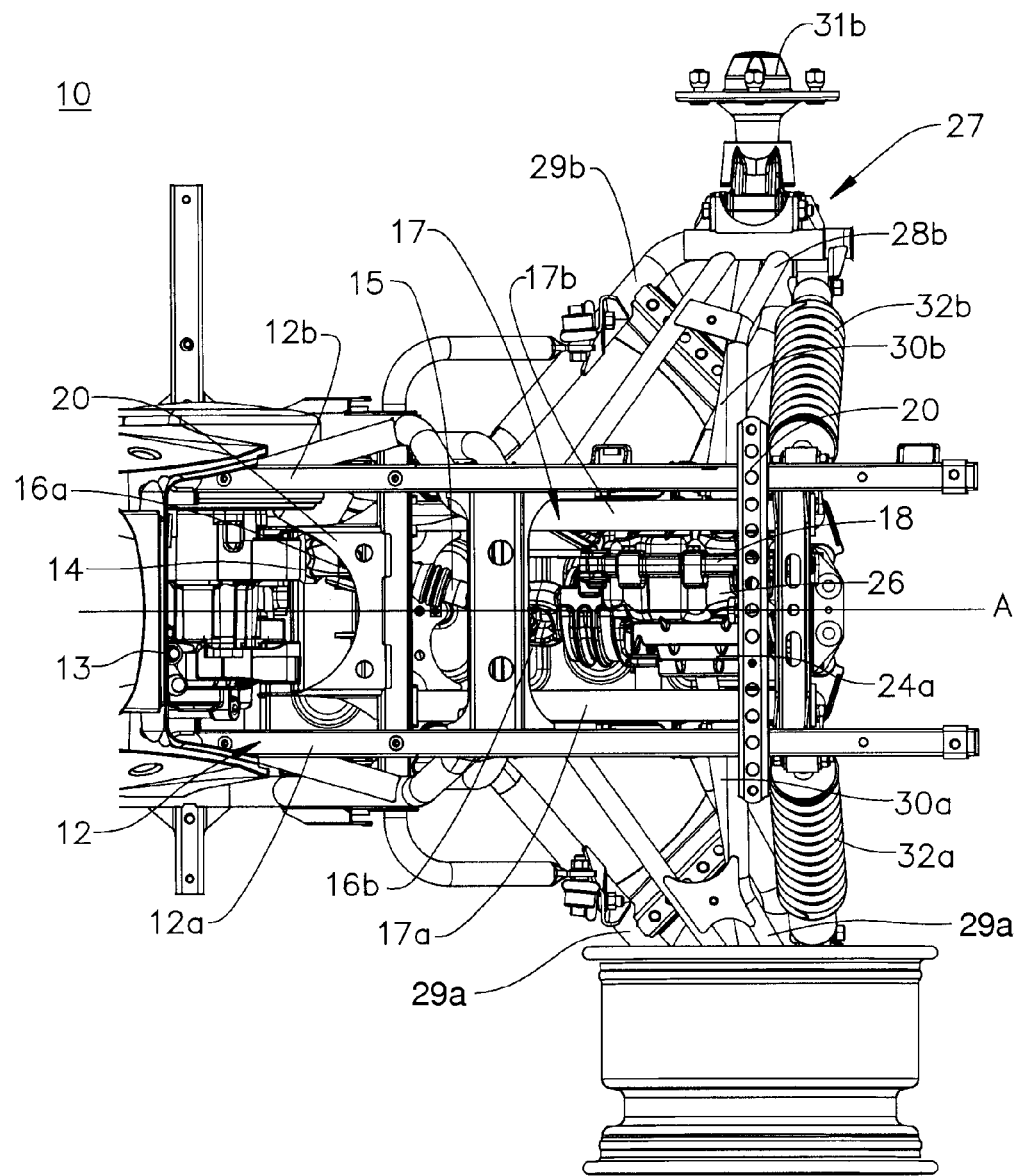
FIG. 4A is a partial top plan view of a drive train assembly including a rear gear and brake assembly of a vehicle according to a preferred embodiment of the present invention.
Figure 4B:
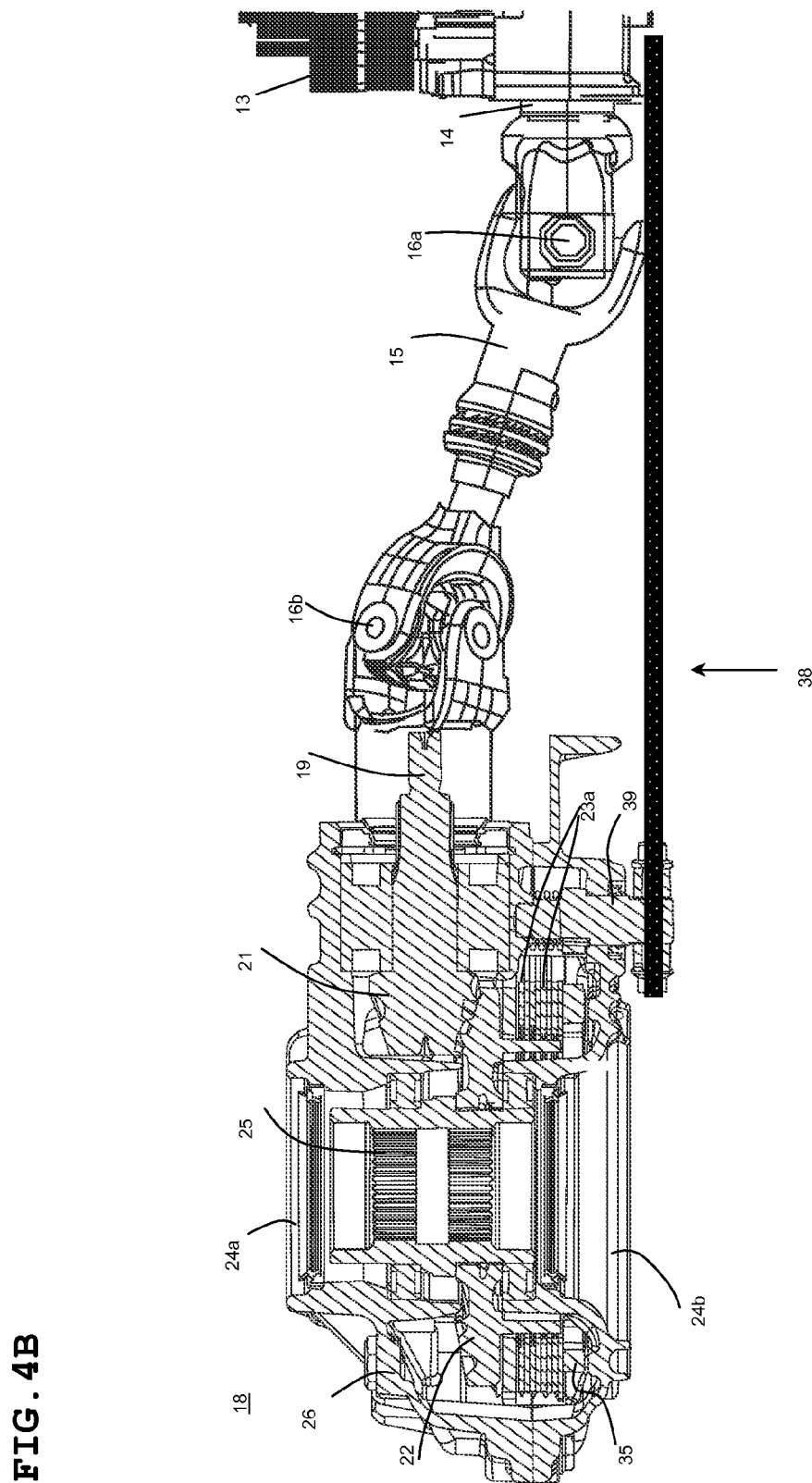
FIG. 4B is a partial top plan view of the drive train assembly including a sectional view of the rear gear and brake assembly of FIG. 4A.

A vehicle according to various preferred embodiments of the present invention can be a four-wheel drive vehicle, an all-terrain vehicle (ATV), a side-by-side vehicle, or other type of vehicle, such as the ATV 101 shown in FIGS. 1A and 1B. For example, the vehicle according to various preferred embodiments of the present invention can be an ATV having three wheels or four wheels, and can be a sport ATV or a utility ATV. The vehicle can also be two or four wheel drive.

As seen in FIGS. 2-4B, a vehicle 10 according to a preferred embodiment of the present invention includes a main frame 12 including a left main frame 12a, a right main frame 12b, and connecting members 20. The left main frame 12a and the right main frame 12b extend along the longitudinal direction of the vehicle 10. The general shape of the left main frame 12a and the right main frame 12b is preferably trapezoidal, with the top and bottom sides parallel or substantially parallel to each other. The shape of the left main frame 12a and the right main frame 12b can be a shape other than trapezoidal. The left main frame 12a and the right main frame 12b are connected to one another by connecting members 20. The left main frame 12a and the right main frame 12b can be planar or non-planar. The left main frame 12a and the right main frame 12b are parallel or substantially parallel to one another. For example, the left main frame 12a and the right main frame 12b can be parallel to one another in the middle region of the vehicle 10 and can converge to a point in the front region of the vehicle 10.

The engine 13 is located between the left main frame 12a and the right main frame 12b. Any suitable engine can be used. The engine 13 is typically bolted to the main frame 12, but any other suitable attachment technique can be used to attach the engine 13 to the main frame 12. From the engine 13, an engine output shaft 14 extends. The engine output shaft 14 extends from the engine 13 parallel to the centerline A of the vehicle 10. With respect to the engine output shaft 14, the term parallel means parallel within standard design and manufacturing tolerances, which includes approximately or substantially parallel. The engine output shaft 14 is spaced away from the centerline A of the vehicle 10 in the transverse direction.

A sub-frame 17 is attached to the rear of the main frame 12. The sub-frame 17 can be attached by any suitable attachment technique, including welding and bolting, or can be attached any combination of suitable attachment techniques. The sub-frame 17 includes a left sub-frame 17a, a right sub-frame 17b, and connecting members 17c, 17d. As with the left main frame 12a and the right main frame 12b, the left sub-frame 17a and the right sub-frame 17b extend along the longitudinal direction of the vehicle 10, although along a shorter distance. The shape of the left sub-frame 17a and the right sub-frame 17b is preferably generally trapezoidal, with the top and bottom sides parallel or substantially parallel to each other. The shape of the left sub-frame 17a and the right sub-frame 17b can be a shape other than trapezoidal. The left sub-frame 17a and the right sub-frame 17b are connected to one another by connecting members 17c, 17d. The left sub-frame 17a and the right sub-frame 17b can be planar or non-planar. The left sub-frame 17a and the right sub-frame 17b are parallel or substantially parallel to one another.

Use of the sub-frame 17 makes the manufacturing of the vehicle 10 easier. However, it is possible to use a single, unitary frame that combines both the main frame 12 and the sub-frame 17.

The independent suspension system 27 for the rear wheels is attached to the sub-frame 17 and to the combined wet brake and rear gear assembly 18. The independent suspension system 27 preferably includes a left upper arm 28a, a right upper arm 28b, a left lower arm 29a, a right lower arm 29b, a left wheel drive shaft 30a, a right wheel drive shaft 30b, a left rear knuckle 31a, a right rear knuckle 31b, a left shock absorber 32a, and a right shock absorber 32b.

One end of the left upper arm 28a, the right upper arm 28b, the left lower arm 29a, and the right lower arm 29b is attached to sub-frame 17 by any suitable method that allows the left upper arm 28a, the right upper arm 28b, the left lower arm 29a, and the right lower arm 29b to move in the up and down directions. The other end of the left upper arm 28a, the right upper arm 28b, the left lower arm 29a, and the right lower arm 29b is attached to the corresponding left knuckle 31a or right knuckle 31b by any suitable method that allows the left upper arm 28a and the left lower arm 29a to move in unison and the right upper arm 28b and the right lower arm 29b to move in unison. The components of the independent suspension system 27 are arranged to allow the left upper arm 28a and the left lower arm 29a to move independently from the right upper arm 28b and the right lower arm 29b.

One end of the left shock absorber 32a and the right shock absorber 32b is attached to the sub-frame 17. The other end of the left shock absorber 32a and the right shock absorber 32b is attached to the corresponding left lower arm 29a or right lower arm 29b. The left shock absorber 32a and the right shock absorber 32b are attached by any suitable method that allows the left shock absorber 32a and the right shock absorber 32b to dampen the movement of the corresponding left lower arm 29a and right lower arm 29b, respectively. Instead of using shock absorbers 32a and 32b, any other suitable dampening elements can also be used.

First ends of the left wheel drive shaft 30a and the right wheel drive shaft 30b are connected to the corresponding left constant velocity joint 24a and right constant velocity joint 24b, which are further discussed below. Second ends of the left wheel drive shaft 30a and the right wheel drive shaft 30b are attached to the corresponding left and right wheels (not shown) by any suitable method. With this arrangement of the left wheel drive shaft 30a, the right wheel drive shaft 30b, the left constant velocity joint 24a, and the right constant velocity joint 24b, power can be transferred from the left constant velocity joint 24a and the right constant velocity joint 24b to the left and right wheels.

Although a specific arrangement for an independent suspension system has been described above, other suitable arrangements could also be used that allow the left and right side suspension systems to be independent of each other.

Figure 5:
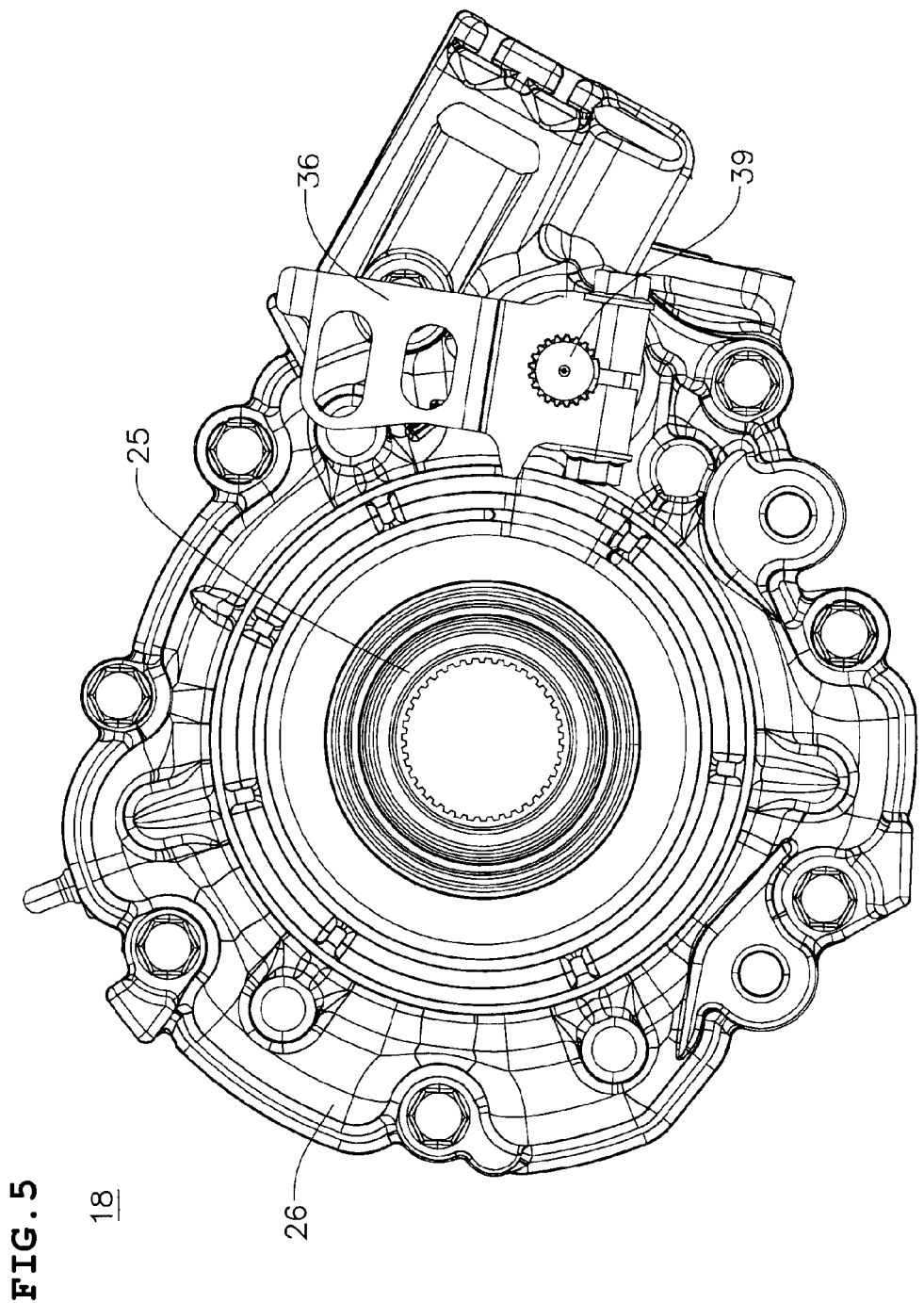
FIG. 5 is a side view of a combined wet brake and rear gear assembly according to a preferred embodiment of the present invention.
Figure 6:
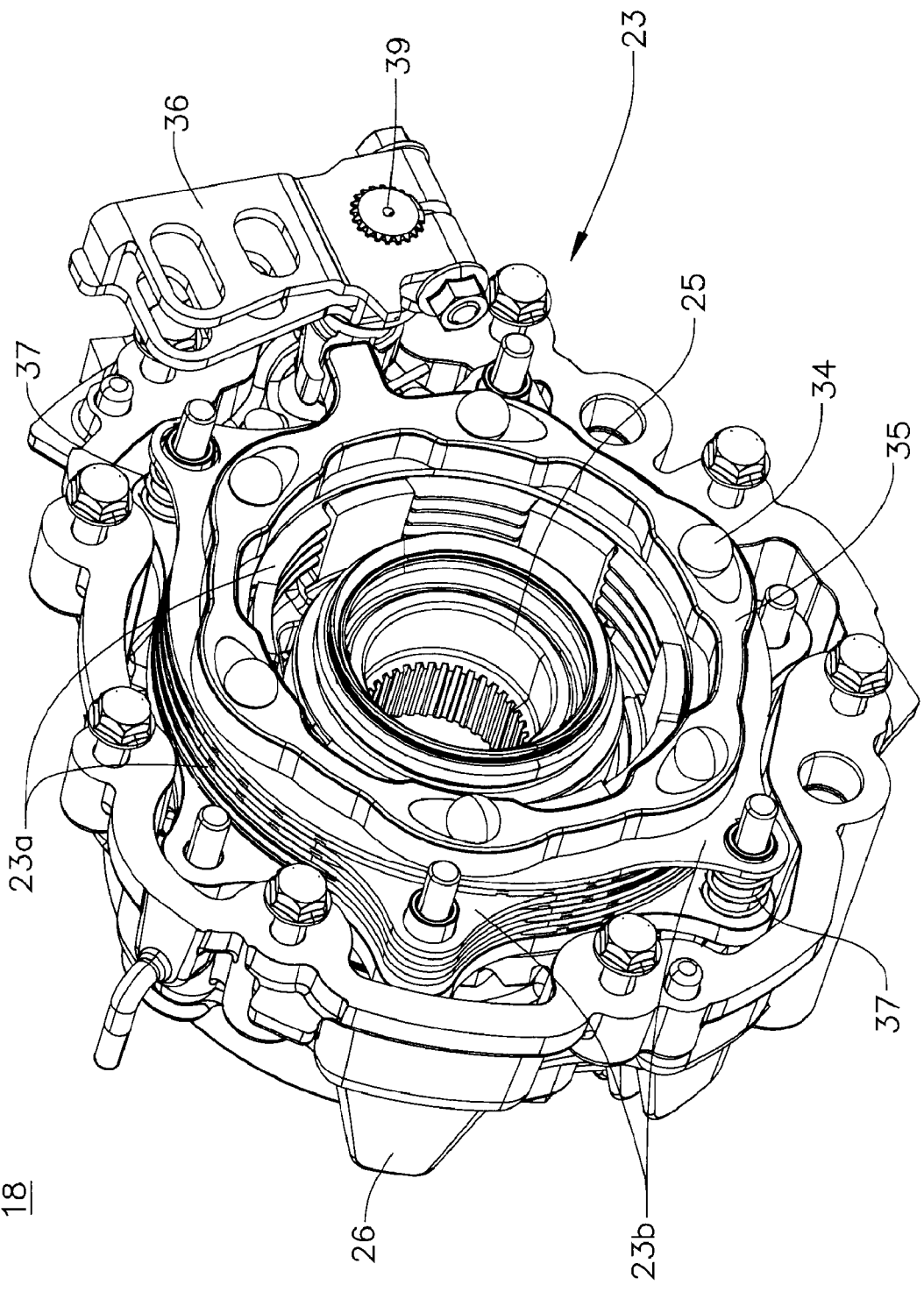
FIG. 6 is a partially disassembled side view of the combined wet brake and rear gear assembly of FIG. 5.
Figure 7:
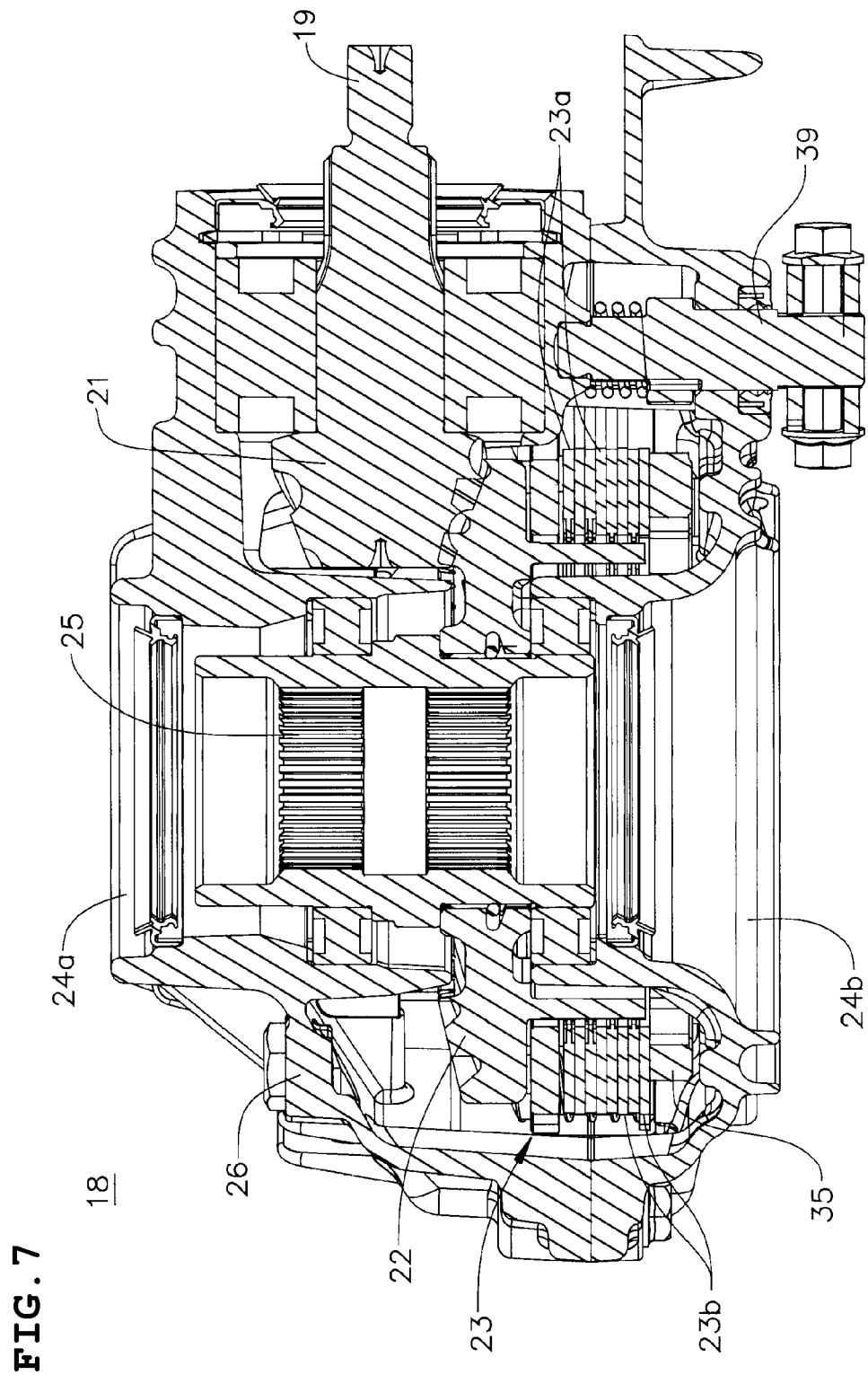
FIG. 7 is a top sectional view of the combined wet brake and rear gear assembly according to a preferred embodiment of the present invention.

A combined wet brake and rear gear assembly 18 including a wet friction disk brake ("wet disk brake") 23, described later with reference to FIGS. 5-7, is preferably located between the left sub-frame 17a and the right sub-frame 17b. The combined wet brake and rear gear assembly 18 can be attached by any suitable attachment technique, including welding and bolting, or can be attached by any combination of suitable attachment techniques. An input shaft 19 extends from the combined wet brake and rear gear assembly 18 parallel to the centerline A of the vehicle 10. With respect to the input shaft 19, the term parallel means parallel within standard design and manufacturing tolerances, which includes approximately or substantially parallel. Also, the input shaft 19 can be located at the centerline A of the vehicle 10 in the transverse direction or can be located on either side of the centerline A of the vehicle 10 in the transverse direction. The input shaft 19 can be tilted or inclined with respect to the centerline A of the vehicle.

Because the combined wet brake and rear gear assembly 18 is located within the sub-frame 17, several advantageous results are achieved. First, balance of the vehicle 10 is improved because the moment of inertia is reduced as compared to the case where the combined wet brake and rear gear assembly 18 is located at the wheels. Because the balance of the vehicle is improved, the overall handling of the vehicle 10 is improved.

Second, the wet disk brake 23, described later, which is provided in the combined wet brake and rear gear assembly 18, is better protected from damage as compared to if the wet disk brake 23 was located at the wheel as in the prior art discussed above. When the brake device is located at the wheel, the brake device is exposed to objects (e.g., rocks, dirt, sticks, debris, etc.) that can damage the brake device.

The engine 13 and the combined wet brake and rear gear assembly 18 are connected to each other. The engine output shaft 14 is connected to one end of the propeller shaft 15 by a universal joint 16a. The other end of the propeller shaft 15 is connected to input shaft 19 by another universal joint 16b. The centerline of the propeller shaft 15 is tilted or inclined with respect to the centerline A of the vehicle in a top plan view. With this arrangement of the engine output shaft 14, the propeller shaft 15, and the input shaft 19, the power of the engine 13 can be efficiently transferred to the combined wet brake and rear gear assembly 18. It should be noted that the centerline of the propeller shaft 15 can also be in line with, and not inclined with respect to, the centerline A of the vehicle in a top plan view.

As shown in FIGS. 4A-7, within the housing 26 of the combined wet brake and rear gear assembly 18 are located a pinion gear 21, a ring gear 22, a wet disk brake 23, a left constant velocity joint 24a, a right constant velocity joint 24b, and a rear wheel drive shaft 25. A bevel gear or any other suitable gear could be used for the ring gear.

The pinion gear 21 is connected to the input shaft 19, which, as discussed above, receives power from the engine 13.

The wet disk brake 23 is preferably located between the right sub-frame 17b and the input shaft 19 in the transverse direction of the vehicle 10 in a top plan view. The wet disk brake 23 can also be located between the left sub-frame 17a and the input shaft 19 in the transverse direction of the vehicle 10 in a top plan view. The wet disk brake 23 is preferably located between the engine output shaft 14 and the input shaft 19 in the transverse direction of the vehicle 10 in a top plan view, but the wet disk brake 23 can be also located elsewhere between the left sub-frame 17a and the right sub-frame 17b without departing from the scope of the present invention.

In addition, it is preferred that the wet disk brake 23 is located between the ring gear 22 and the right rear wheel drive shaft 30b that engages with the rear wheel drive shaft 25 shown in FIG. 7. In other words, the wet disk brake 23 and the ring gear 22 are located to one side (the lower side in FIG. 7) relative to a longitudinal axis of the input shaft 19 such that that ring gear 22 is closer to the longitudinal axis of the input shaft 19 than the wet disk brake 23.

The pinion gear 21 is in contact with the ring gear 22. The ring gear 22 is connected to the rear wheel drive shaft 25. The pinion gear 21 and ring gear 22 are arranged such that the axis of rotation of the input shaft 19 and the axis of rotation of the rear wheel drive shaft 25 are perpendicular or substantially perpendicular. With respect to the axis of rotation of the input shaft 19 and the axis of rotation of the rear wheel drive shaft 25, the term parallel means parallel within standard design and manufacturing tolerances, which includes approximately or substantially parallel. The axis of rotation of the input shaft 19 and the axis of rotation of the rear wheel drive shaft 25 can also be non-perpendicular. For example, if the input shaft 19 is tilted or inclined with respect to the centerline A of the vehicle 10, then the axis of rotation of the input shaft 19 and the axis of rotation of the rear wheel drive shaft 25 would not be parallel. The rear wheel drive shaft 25 is connected at opposite ends to the left constant velocity joint 24a and the right constant velocity joint 24b. With this arrangement of the pinion gear 21, the ring gear 22, and the rear wheel drive shaft 25, power can be transferred from the input shaft 19 to the left constant velocity joint 24a and to the right constant velocity joint 24b. The wet disk brake 23 is connected to the ring gear 22, to the rear wheel drive shaft 25, and to the housing 26.

As seen in FIGS. 6 and 7, the wet disk brake 23 preferably includes a plurality of rotating disks 23a, a plurality of stationary disks 23b, ball bearings 34, activation ring 35, lever 36, springs 37, and lever shaft 39. The plurality of rotating disks 23a are connected to the ring gear 22. The plurality of stationary disks 23b are connected to the housing 26 of the combined wet brake and rear gear assembly 18.

A main surface of each of the plurality of rotating disks 23a and of the plurality of stationary disks 23b is parallel to a centerline of the input shaft 19. Also, the axis of rotation of the plurality of rotating disks 23a is parallel to the axis of rotation of the ring gear 22. With respect to the plurality of rotating disks 23a and of the plurality of stationary disks 23b, the term parallel means parallel within standard design and manufacturing tolerances, which includes approximately or substantially parallel. The main surface of each of the plurality of rotating disks 23a and of the plurality of stationary disks 23b can be non-parallel to a centerline of the input shaft 19. For example, if the input shaft 19 is tilted or inclined with respect to the centerline A of the vehicle 10, then the main surface of each of the plurality of rotating disks 23a and of the plurality of stationary disks 23b and the centerline of the input shaft 19 would not be parallel. The plurality of rotating disks 23a and the plurality of stationary disks 23b alternate with each other. The alternating plurality of rotating disks 23a and plurality of stationary disks 23b have a diameter that is greater than the diameter of the ring gear 22 for more efficient braking. The outermost stationary disk 23b is pushed toward the inner surface of the housing 26 by the springs 37.

As noted above, the combined wet brake and rear gear assembly 18, including the wet disk brake 23 within the housing 26, in the present invention is located on the rear wheel drive shaft 25 instead of located on the input shaft or on a rear wheel shaft with a differential as in the prior art discussed above. As a result, a much more efficient braking system is provided because the rear wheel drive shaft 25, the left and right rear wheel drive shafts 30a and 30b, and the input shaft 19 can all be effectively braked by a simple assembly 18. Furthermore, if the vehicle 10 is in four wheel drive mode, the combined wet brake and rear gear assembly 18 can also brake the front wheel drive shaft (not shown). Also, this unique arrangement allows for multiple locations of the combined wet brake and rear gear assembly 18 with respect to the engine 13, the main frame 12, and the sub-frame 17 to optimize vehicle performance and allows for better optimization of drive train performance, especially optimization of the offset angles between the engine output shaft 14, the propeller shaft 15, and the input shaft 19.

The activation ring 35 is located directly adjacent to one of the outermost stationary disks 23b and is connected to the lever 36 through lever shaft 39. The lever 36 is located outside of the housing 26 of the combined wet brake and rear gear assembly 18 and is connected to the lever shaft 39 such that, when the lever 36 is rotated, the lever shaft 39 is rotated.

The lever shaft 39 is located between the universal joint 16b, which connects the input shaft 19 and the propeller shaft 15, and the rear wheel drive shaft 25. The centerline of the lever shaft 39 is parallel with the centerline of the rear wheel drive shaft 25.

The ball bearings 34 are located in sloped grooves in the activation ring 35 and contact the inner surface of the housing 26. The inner surface of the housing 26 includes sloped grooves that correspond to the sloped grooves in the activation ring 35 and that act in cooperation with the sloped grooves in the activation ring 35.

To activate the wet brake 23, a rider or driver of the vehicle engages, with the foot, hand, or both, the braking mechanism(s) (not shown), which causes the cables 38 to be pulled forward. One of the cables 38 is engaged by activating a hand braking mechanism, and the other of the cables 38 is engaged by activating foot braking mechanism, for example. Instead of having both a hand braking mechanism and a foot breaking mechanism including two cables, the vehicle can also have either only a hand braking mechanism or only a foot breaking mechanism, in which case only one cable 38 is needed. Alternatively, one cable 38 could be engaged by activating a hand braking mechanism, a foot breaking mechanism, or both. In this arrangement, the hand braking mechanism and the foot breaking mechanism would be connected.

The cables 38 extend from the braking mechanism(s) to the lever 36, and the portion of the cables 38 that are located between the left sub-frame 17a and the right sub-frame 17b are provided between the input shaft 19 and the right sub-frame 17b in the transverse direction of the vehicle 10 in a top plan view. The centerline of the cables 38 provided between the input shaft 19 and the right sub-frame 17b is parallel or substantially parallel to the centerline A of the vehicle 10, which allows for more efficient actuation of the wet disk brake 23.

When the cable or cables 38 are pulled forward, the lever 36 is pulled forward, which causes the lever shaft 39 to rotate. The rotation of the lever shaft 39 causes the activation ring 35 to rotate. The rotation of the activation ring 35 causes the ball bearings 34 to roll up the sloped grooves, which causes the activation ring 35 to be pushed away from the inner surface of the housing 26. The pushing away from the inner surface of the housing 26 causes the alternating plurality of rotating disks 23a and plurality of stationary disks 23b to be pressed into each other. The farther the lever 36 is rotated, the harder the alternating plurality of rotating disks 23a and plurality of stationary disks 23b are pressed into each other. The friction between the alternating plurality of rotating disks 23a and plurality of stationary disks 23b when being pressed into each other causes the rotation of the rear wheel drive shaft 25 to slow and eventually to stop, which causes the vehicle 10 to slow and eventually to stop.

When the rider or driver of the vehicle 10 is not engaging the braking mechanism(s), the cables 38 are not pulled forward, the lever 36 is not pulled forward, the lever shaft 39 is not rotated, the activation ring 35 is not rotated, and the alternating plurality of rotating disks 23a and plurality of stationary disks 23b are not pressed into each other. The springs 37 press the outer most stationary disk 23b toward the inner surface of the housing 26, which causes the alternating plurality of rotating disks 23a and plurality of stationary disks 23b not to be pressed into each other.

The housing 26 of the combined wet brake and rear gear assembly 18 seals in a fluid (not shown) that lubricates and cools the alternating plurality of rotating disks 23a and plurality of stationary disks 23b. The lubricating and cooling fluid forms a reservoir pool in the bottom of the housing 26 such that only a portion of the alternating plurality of rotating disks 23a and plurality of stationary disks 23b are submerged in the lubricating fluid. The ring gear 22 is also submerged in the lubricating and cooling fluid contained in the housing 26. The lubricating fluid lubricates the alternating plurality of rotating disks 23a and plurality of stationary disks 23b when they are pressed together. Because the housing 26 is sealed, dirt, water, and other abrasive or harmful materials cannot come into contact with the wet brake 23, which increases the life of the wet brake 23.

It is important to note that the preferred embodiments of the present invention are to be used in a rear non-differential system for more efficient braking and to ensure the flexibility and design freedom of location of the combined wet brake and rear gear assembly.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A vehicle comprising:
a brake device;
a gear;
a housing surrounding the brake device and the gear;
first and second frames supporting the housing;
an input shaft including a gear portion connected to the gear;
a plurality of friction plates and an activation ring arranged to press the plurality of friction plates together, an axis of rotation of the plurality of friction plates arranged to be parallel or substantially parallel to an axis of rotation of the gear, and the plurality of friction plates arranged between the gear and the activation ring; and
a left constant velocity joint connected to a left wheel drive shaft, and a right constant velocity joint connected to a right wheel drive shaft; wherein
the brake device is disposed between one of the first and second frames and the input shaft in a transverse direction of the vehicle in a top plan view;
the brake device and the gear are both arranged between the left constant velocity joint and the right constant velocity joint in the transverse direction of the vehicle in the top plan view;
the gear is a ring gear or a bevel gear.

2. A vehicle according to claim 1, wherein the housing surrounds the brake device and the gear and a fluid is contained and sealed within the housing.

3. A vehicle according to claim 1, wherein the brake device is a wet friction disk brake device.

4. A vehicle according to claim 1, wherein a main surface of each of the plurality of friction plates is substantially parallel to a centerline of the input shaft.

5. A vehicle according to claim 1, wherein the plurality of friction plates has a diameter that is larger than a diameter of the gear.

6. A vehicle according to claim 1, wherein the input shaft is disposed on one side of a longitudinal centerline of the vehicle in the top plan view and the brake device is disposed on the other side of the longitudinal centerline of the vehicle in the top plan view.

7. A vehicle according to claim 1, further comprising:
an engine output shaft; and
a propeller shaft connected to the input shaft and the engine output shaft; wherein
a centerline of the propeller shaft is inclined with respect to a longitudinal centerline of the vehicle in the top plan view; and
a front end of the propeller shaft is spaced away from the longitudinal centerline of the vehicle in the top plan view.

8. A vehicle according to claim 1, further comprising:
an engine output shaft connected to the input shaft; wherein
the brake device is disposed between the engine output shaft and the input shaft in the transverse direction of the vehicle in the top plan view.

9. A vehicle according to claim 1, wherein the gear is disposed between one of the first and second frames and the input shaft in the transverse direction of the vehicle in the top plan view.

10. A vehicle according to claim 1, wherein the gear is disposed between the input shaft and the brake device in the transverse direction of the vehicle in the top plan view.

11. A vehicle according to claim 1, further comprising an independent suspension connected to the brake device and the gear.

12. A vehicle according to claim 1, wherein the gear defines a portion of a rear gear assembly, and the rear gear assembly does not include a differential.

13. A vehicle according to claim 1, wherein the housing includes a lever for operating the brake device.

14. A vehicle according to claim 13, further comprising at least one cable connected to the lever; wherein
a portion of the at least one cable is disposed between one of the first and second frames and the input shaft in the transverse direction of the vehicle in the top plan view.

15. A vehicle according to claim 13, further comprising:
an output shaft connected to the gear; and
a lever shaft connected to the lever; wherein
a centerline of the lever shaft is substantially parallel to a centerline of the output shaft in the top plan view; and
the lever shaft is disposed further toward a front of the vehicle than the output shaft.

16. A vehicle according to claim 15, further comprising a universal joint connected to the input shaft; wherein
the lever shaft is disposed between the output shaft and the universal joint.

17. A vehicle according to claim 1, further comprising an engine output shaft; wherein
the input shaft is offset from the engine output shaft in the transverse direction of the vehicle in the top plan view.

18. A vehicle according to claim 17, wherein the input shaft is substantially parallel to the engine output shaft in the top plan view.

19. A vehicle according to claim 18, wherein the brake device is disposed between the engine output shaft and the input shaft in the transverse direction of the vehicle in the top plan view.

* * * * *